United States Patent [19]

Kang

[11] Patent Number: 4,659,382
[45] Date of Patent: Apr. 21, 1987

[54] WATERFAST INK JET COMPOSITIONS AND PROCESS

[75] Inventor: Henry R. Kang, Fairport, N.Y.

[73] Assignee: Xerox Corporation, Stamford, Conn.

[21] Appl. No.: 797,312

[22] Filed: Nov. 12, 1985

[51] Int. Cl.$^4$ .............................................. C09D 11/10
[52] U.S. Cl. ...................................... 106/22; 523/160; 260/DIG. 38
[58] Field of Search .................... 106/20, 22; 523/160; 260/DIG. 38

[56] References Cited

U.S. PATENT DOCUMENTS

| | | | |
|---|---|---|---|
| 3,864,296 | 2/1975 | Faessinger | 260/29.2 N |
| 4,150,997 | 4/1979 | Hayes | 106/20 |
| 4,167,393 | 9/1979 | deRoo | 8/7 |
| 4,184,881 | 1/1980 | Bradley | 106/20 |
| 4,197,135 | 4/1980 | Bailey et al. | 106/23 |
| 4,238,234 | 12/1980 | Lang | 106/22 |
| 4,267,088 | 5/1981 | Kempf | 106/20 |

Primary Examiner—Amelia B. Yarbrough

[57] ABSTRACT

Disclosed in an ink jet composition comprised of a major amount of water, a hydroxyethylated polyethylenimine polymer, and a dye component wherein the polymer has incorporated therein from about 65 percent by weight to about 80 percent by weight of hydroxyethyl groups.

26 Claims, No Drawings

WATERFAST INK JET COMPOSITIONS AND PROCESS

BACKGROUND OF THE INVENTION

The present invention is generally directed to ink compositions useful in various imaging systems, and more specifically, the present invention is directed to certain ink jet printing compositions, and to processes for the preparation thereof. Accordingly, in one embodiment of the present invention, there is provided aqueous ink compositions comprised of modified polyimines, especially specific derivatives of polyethylenimines. The aforementioned ink compositions, in addition to possessing improved waterfastness, are of a desirable nonfishy odor; and further, these inks are free of environmental hazards in that they, for example, evidence a negative Ames factor, and thus are nonmutagenic. Also, the ink compositions of the present invention can be altered by adding thereto spreading substances such as benzyl alcohol, thereby enabling increased spot sizes. The ink compositions of the present invention also possess other desirable characteristics including a low pH, for example about 9, in a specific embodiment; low viscosity values; and further, the inks are stable at elevated temperatures.

Compositions which are useful in ink jet printing systems are well known, and generally contain water soluble dyes. There is thus disclosed, for example, in U.S. Pat. No. 3,846,141 an ink composition useful in jet printing comprised of an aqueous solution of a water-soluble dye; and a humectant material formed of a mixture of a lower alkoxy triglycol, and at least one other compound selected from the group consisting of a polyethylene glycol, a lower alkyl ether of diethylene glycol, and glycerol. According to the disclosure of this patent, the printing inks viscosity is subjected to little variation with use as water is lost by evaporation during recirculation of the ink composition through the jet printer. Moreover, apparently the humectant system disclosed in this patent substantially prevents or minimizes tip drying of the printing ink in the orifice or nozzle during down time of the printer, such as when the printer is rendered inoperative. As further disclosed in this patent, the basic imaging technique in jet printing involves the use of one or more ink jet assemblies connected to a pressurized source of ink. Each individual ink jet includes a very small orifice usually of a diameter of 0.0024 inches, which is energized by magneto restrictive piezo-electric means for the purpose of emitting a continuous stream of uniform droplets of ink at a rate of 33 to 75 kilohertz. This stream of droplets is desirably directed onto the surface of a moving web of, for example, paper; and is controlled to form printed characters in response to video signals derived from an electronic character generator and in response to an electrostatic deflection system.

Also, there is disclosed in U.S. Pat. No. 4,279,653 ink jet compositions containing water-soluble wetting agents, a water-soluble dye and an oxygen absorber. Similarly, U.S. Pat. No. 4,196,007 describes an ink jet printing composition containing an aqueous solution of a water-soluble dye and a humectant consisting of at least one water-soluble unsaturated compound. Further, there is disclosed in U.S. Pat. No. 4,267,088 coatings particularly useful as marking inks wherein there is selected an epichlorohydron-modified polyethylenimine, and an ethylene oxide modified polyethylenimine in an aqueous solution. Other patents that may be of interest are U.S. Pat. Nos. 4,101,329; 4,290,072; 4,383,859; 4,235,773; 4,279,814; 4,443,371; 4,286,989; 4,299,630; 4,167,393; 3,864,296; 4,238,234; 3,234,025; 4,520,143; 3,920,855; and 4,182,612.

Additionally, there is disclosed in U.S. Pat. No. 4,197,135 ink compositions with improved waterfastness comprised of at least one water soluble dye, and a polyamine with 7 or more nitrogen atoms per molecule. Specifically, there is illustrated in this patent an ink composition comprising an aqueous solution of at least one water-soluble dye, and about 0.5 percent to about 10 percent by weight concentration of a polyamine having 7 or more nitrogen atoms per molecule; and wherein the composition has a pH of 8 or above. In column 1, beginning at line 61, it is indicated that the preferred polyamines have the hydrogen of the primary amine group replaced with either a methyl or a hydroxyethyl group. Examples of fully substituted polyamines selected are outlined in column 2, beginning at line 40, of the '135 patent. The invention of the present application is directed to similar inks with the exception that the the amine, and more specifically, the polyethylene amine or polyethylenimine is not fully substituted thereby resulting in inks with improved waterfastness in comparison to those as illustrated in the '135 patent.

Ink compositions for jet printing can be prepared by a number of known methods. Generally, these methods involve dissolving the various dyes, humectants, viscosity control agents, paper fixing additives, surface tension control additives, biocides and anti-oxidants in a known volume of water, followed by adjusting the pH of the solution to desirable level. In those situations where the pigments selected are not water-soluble, the inks are prepared by standard known milling processes. However, such pigment dispersions are generally not sufficiently stable, accordingly when incorporated into a printing machine the ink particles tend to agglomerate resulting in the clogging of the small nozzles contained in the ink jet devices.

While the above compositions may be suitable for their intended purposes, there continues to be a need for improved ink jet compositions and processes thereof. Additionally, there continues to be a need for ink jet compositions which when in use result in superior optical print densities, and have excellent waterfastness characteristics. Moreover, there continues to be a need for inks that possess nonmutagenic characteristics enabling them to be safely used in ink jet printing processes. Also, there is a need for ink compositions that enable an increase in the spot size of the ink. Furthermore, there is a specific need for nonmutagenic ink compositions with a waterfastness of greater than about 80 percent.

SUMMARY OF THE INVENTION

It is an object of the present invention to provide ink compositions, and process thereof which overcome some of the abovenoted disadvantages.

In another object of the present invention there is provided ink jet compositions with improved waterfastness.

In another object of the present invention there is provided ink compositions with modified polyethylenimines therein and dyes.

An additional object of the present invention resides in the provision of ink compositions containing in addition to modified polyethylenimines, spreading additives, humectants, biocides, chelating agents, and buffer solutions.

A further object of the present invention relates to the provision of aqueous ink compositions comprised of dyes and polyethylenimines substituted with from about 65 percent to about 80 percent by weight of hydroxyethyl groups.

Also, in another object of the present invention there are provided ink compositions with hydroxyethyl substituted polyethylenimines, which inks have waterfastness characteristics exceeding 80 percent.

Furthermore, in another object of the present invention there are provided ink compositions with polyethylenimines and spreading agent components for the purpose of enabling increased spot size on substrates such as paper.

These and other objects of the present invention are accomplished by the provision of ink compositions for jet printing comprised of hydroxylated polyethylenimines, dyes and water. There is thus provided in one embodiment of the present invention an ink composition with improved waterfastness useful for jet printing processes comprised of a major amount of water, a hydroxyethylated polyethylenimine polymer and a dye composition wherein the polymer has incorporated therein from about 65 percent to about 80 percent by weight of hydroxyethyl groups.

A specific preferred ink composition of the present invention is comprised of from about 70 percent by weight to about 90 percent by weight of water; from about 1 percent by weight to about 10 percent by weight of a dye molecule; from about 2 percent by weight to about 6 percent by weight of a hydroxy ethylated polyethylenimine having incorporated therein from about 65 percent by weight to about 80 percent by weight of hydroxyl substituents; and additive components as illustrated hereinafter.

In another embodiment of the present invention there is provided a process for the preparation of particles for ink jet printing which comprises (1) providing a polyethylenimine; (2) affecting modification thereof by replacing the hydrogen atoms with from about 65 percent to about 80 percent of hydroxy substituents; and (3) mixing the resulting components with water. In one preferred embodiment of the present invention about 80 percent of the hydrogens of the selected polyethylenimines are replaced with hydroxyethyl groups.

Hydroxyethylated polyethylenimines selected for the ink compositions of the present invention, wherein there is present from about 65 percent by weight to about 80 percent by weight of hydroxyethyl groups thereon, are readily available from Polysciences Incorporated; Morton Thiokel; and Scientic Polymer Products, Inc. of Rochester, N.Y. These polymers are believed to be of a molecular weight of from about 4,000 to about 140,000.

From about 1.0 to about 10 and preferably from about 2.0 to about 6.0 percent by weight of hydroxyethylated polyethylenimine is present in the ink composition, however, other amounts may be selected providing the objectives of the present invention are achieved.

Of importance with respect to the ink compositions of the present invention is the pH of the resulting mixture, which is from about 8 to about 10, and preferably about 9. Thus, it is believed that the waterfastness characteristics of the ink compositions of the present invention are dependent on the pH thereof, this fastness decreasing with increasing pH. Furthermore, a pH of ink of lower than 8 may in some situations adversely affect the waterfastness characteristics of the resulting inks.

Illustrative examples of dyes that may be selected for the ink compositions of the present invention include Pontamine, Direct Black 19, Direct Black 38, Food Black 2, Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich; Drimarene Brilliant Red X-2B (Reactive Red 56), available from Pylam; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Phloxine B, available from Pylam; Direct Brill Pink B Ground Crude, available from Crompton and Knowles; Cartasol Yellow GTF Presscake, available from Sandoz; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz; D&C Yellow #10 (Acid Yellow 3), available from Tricon; and Yellow Shade 16948, available from Tricon. From about 1 to about 10, and preferably from about 4 to 8 percent by weight of dye is present in the ink composition, however, other amounts may be selected providing the objectives of the present invention are achieved.

The ink compositions of the present invention include therein a major amount of water, preferably distilled or deionized water. For example, the amount of water present is from about 70 percent to about 90 percent, and preferably from about 80 to about 85 percent by weight.

Other known additives may be incorporated into the ink compositions of the present invention inclusive of biocides in an amount of 0.1 to 0.5 percent, and preferably in an amount of 0.1 percent by weight, such as Dowcil-75; chelating agents in an amount of from about 0.1 percent to about 0.5 percent by weight, and preferably in an amount of from about 0.2 percent by weight to about 0.4 percent by weight, such as EDTANa 4, commercially available; a buffer solution present in an amount of from about 5 percent to about 20 percent, and preferably in an amount of 5 to 10 weight percent, inclusive of a mixture of a sodium hydroxide solution and a sodium bicarbonate solution; and a humectant in an amount of from about 1 percent to about 15 weight percent, and preferably in an amount of from about 5 percent to about 10 weight percent, such as glycerol.

Important specific properties associated with the ink compositions of the present invention include a pH of from about 8 to about 10, a surface tension of from about 30 dynes/cm$^2$ to about 60 dynes/cm2, a viscosity from about 1.5 to about 3.0, and a waterfastness of from about 80 to about 95 percent. Moreover, the ink compositions of the present invention are very useful in ink jet printing systems since, for example, the ink jet nozzles directing the ink remained essentially open and unclogged, which is not the situation with many ink compositions of the prior art. Also, the ink compositions of the present invention can effectively penetrate the spaces between the fibers contained on the paper substrate allowing a desirable matte finish.

A further important embodiment of the present invention comprises adding to the ink composition spreading substances in an amount of from about 1 percent by weight to about 10 percent by weight, and preferably from about 1 percent by weight to about 5 percent by weight. Examples of the aforementioned substances are benzyl alcohol, N-n(normal)-butyldiethanolamine, 2-(2-butoxyethoxy)-ethanol, and 1-methyl-2-pyrrolidinone. Specifically, the purpose of these substances is to increase the spot size on the paper, for example. Thus, a solid image requires about 35 percent overlap between ink spots. In some situations, inks with polyethylenimines contained therein may decrease the ink drop spread on the paper therefore these inks may have very small spot sizes. Accordingly, the aforementioned spreading agents are incorporated therein.

The following examples are being supplied to further define various species of the present invention, it being noted that these examples are intended to be illustrative only and are not intended to limit the scope of the present invention. Parts and percentages are by weight unless otherwise indicated.

EXAMPLE I

There was prepared a cyan ink composition by admixing 6 percent by weight of the dye Intrabond Liquid Turquoise GLL, 3 percent by weight of a hydroxyethylated polyethylenimine available from Polysciences with a molecular weight of 90,000; and wherein there is present about 80 percent by weight of hydroxyethyl ($C_2H_5OH$) substituents; 7.5 percent by weight of Carbowax 200; 0.1 percent by weight of Dowicil-75; 0.2 percent by weight of EDTA $Na_4$; a buffer consisting of 33 parts by volume of 0.05 molar sodium bicarbonate and 10 parts by volume of 0.1 molar sodium hydroxide, 5 percent by weight; 3 percent by weight of benzyl alcohol; and the balance about 82.7 percent by weight of deionized water.

After mixing for two hours, the ink was filtered through a 5 micron, then a 0.2 micron size filter for the purpose of removing any contamination.

This ink had a waterfastness of 93 percent as determined by measuring the optical densities prior to, and subsequent to immersing the ink as a coating on paper in water for five minutes with stirring. The waterfastness is the ratio of the optical density after immersion into water, and before immersion into water.

A similar ink composition was prepared by repeating the above procedure with the exception that 0 percent by weight of the hydroxyethylated polyethylenimine, and 85.7 percent by weight of water were selected. The waterfastness for this prior art ink composition was 37 percent.

More specifically, with further reference to the above-identified inks, the ink with the 3 percent by weight of the hydroxyethylated polyethylenimine had a waterfastness of 93 percent, a surface tension of 42 dynes/cm, a viscosity of 1.7 centipoises at 25° C., and a pH of 8.8. The ink composition with 0 percent by weight of the hydroxyethylated polyethylenimine in addition to having a low waterfastness of 37 percent had a surface tension of 47 dynes/cm, a viscosity of 1.2 centipoises at 25° C., and a pH of 7.8.

EXAMPLE II

There was prepared a magenta ink composition by repeating the procedure of Example I with the exception that there was selected 4.0 percent by weight of the dye Pylam Certified D&C Red #28; zero percent of benzyl alcohol; 4.0 percent by weight of the hydroxyethylated polyethylenimine; and 86.7 percent by weight of deionized water. This ink had a waterfastness of 94 percent as determined in accordance with the procedure of Example I.

A second ink composition was then prepared by repeating the procedure of Example I with the exception that 0 percent by weight of the hydroxyethylated polyethylenimine, and 90.7 percent by weight of water was selected. This ink had a waterfastness of 22 percent.

Also, the ink composition with the hydroxyethylated polyethylenimine had a surface tension of 60 dynes/cm, a viscosity of 1.5 centipoises at 25° C. and a pH of 11.3; while the ink without the hydroxyethylated polyethylenimine had a surface tension of 66 dynes/cm, a viscosity of 1.0 centipoises at 25° C. and a pH of 9.5. Both of these inks included therein 0.1 percent by weight of Dowicil-75, 0.2 percent of the EDTA $Na_4$, and 5 percent by weight of the buffer solution.

EXAMPLE III

A brilliant magenta ink composition was prepared by repeating the procedure of Example I with the exception that there was selected in place of Torquoise GLL dye the dye Levafix Brilliant Red E-6BA, 6.0 percent by weight; and 4 percent by weight of the hydroxyethylated polyethylenimine; 1 percent by weight of the spreading agent butyl carbitol; 2 percent by weight of the spreading agent benzyl alcohol; and 81.7 weight percent of water. This ink had a waterfastness of 91 percent, a surface tension of 40 dynes/cm, a viscosity of 2.0 centipoises at 25° C., and a pH of 10.

A second identical ink composition was prepared by repeating the above procedure with the exception that 0 percent by weight of the hydroxyethylated polyethylenimine, 85.7 percent by weight of water, 0 percent by weight of benzyl alcohol; and 0 percent by weight of butyl carbitol were selected. This ink had a waterfastness of 57 percent, a surface tension of 37 dynes/cm, a viscosity of 1.1 centipoises at 25° C., and a pH of 7.8.

EXAMPLE IV

There was prepared a yellow ink composition by repeating the procedure of Example I with the exception that there was used in place of the Turquoise GLL dye the dye Cartasol Yellow GTF Liquid Special 110, 6.0 percent by weight; and 84.7 weight percent of deionized water. This ink had a waterfastness of 100 percent, a surface tension of 64 dynes/cm, a viscosity of 2.1 centipoises at 25° C., and a pH of 10.2.

A second ink composition was prepared by repeating the above procedure with the exception that there was used 0 percent by weight of the hydroxyethylated polyethylene polymer; and 88.7 weight percent of deionized water. This ink had a waterfastness of 59 percent, a surface tension of 61 dynes/cm, a viscosity of 1.4 centipoises at 25° C., and a pH of 8.3.

EXAMPLE V

A black ink composition was prepared by repeating the procedure of Example I with the exception that there was selected 6 percent by weight of the black dye Pontamine Black SP Liquid instead of the Turquoise GLL due. The resulting ink had a waterfastness of 95 percent.

There were then prepared three different ink compositions by repeating the procedure of Example I with the primary exception that there was selected in place of the hydroxyethylated polyethylenimine the prior art hydroxyethylated polyethylenimine, which is believed to contain 100 percent by weight of hydroxyl substituents, and is available as hydroxyethylated polyethylenimine polymer 2MB from Cordova Chemical. These prior art inks consisted of the following components with the weight percentages indicated:

| | | | |
|---|---|---|---|
| Pontamine Black SP Liquid | 6% | 6% | 6.0% |
| Polymer 2MB | 12% | 2% | 4.0% |
| Dowicil-75 | 0% | 0% | 0.1% |
| EDTA Na4 | 0% | 0% | 0.2% |
| Buffer | 0% | 0% | 5.0% |
| Benzyl Alcohol | 0% | 0% | 2.0% |
| Deionized Water | 82% | 92% | 82.7% |
| Waterfastness | 42% | 51% | 66.0% |

EXAMPLE VI

Six black ink compositions were prepared with the polyethylenimine polymer of the present invention instead of the 2MB polymer by repeating the procedure of Example V resulting in inks comprised of the following components with the weight percentages indicated:

| | | | | | | |
|---|---|---|---|---|---|---|
| Pontamine | 6.0% | 6.0% | 6.0% | 6.0% | 6.0% | 6.0% |
| Dowicil-75 | — | 0.1% | 0.1% | — | 0.1% | 0.1% |
| EDTA Na4 | — | 0.2% | 0.2% | — | 0.2% | 0.2% |
| Buffer | — | 5.0% | 5.0% | 5.0% | 5.0% | 5.0% |
| PEIHE* -90K | 4.0% | 4.0% | 4.0% | 4.0% | 4.0% | 2.5% |
| Benzyl Alcohol | — | — | 3.0% | 2.0% | 3.0% | 3.0% |
| 1-Methyl-2-pyrrolidinone | — | — | — | — | 5.0% | 5.0% |
| Deionized Water | 90.0% | 80.7% | 81.7% | 83.0% | 76.7% | 78.2% |
| Methyl Carbitol | — | 4 | — | — | — | — |
| Surface Tension (Dynes/cm) | 54 | 53 | 44 | 46 | 42 | 46 |
| Viscosity (Centipoise at 25°) | 1.9 | 2.2 | 2.1 | 2.0 | 2.5 | 2.2 |
| pH | 9.4 | 9.2 | 9.2 | 9.1 | 9.0 | 9.2 |
| Waterfastness | 95 | 88 | 89 | 85 | 85 | 81 |
| K Factor | 1.9 | 1.9 | 2.1 | 2.1 | 2.3 (300 spots per inch) | 2.3 |

*Represents a polyethylenimine of a molecular weight of 90,000 with 80 percent by weight of hydroxyethyl substitutents.

The K factor is defined as the ratio of the spot size to the drop size with the spot size representing the diameter of an ink droplet present on 4024 paper; and the drop size representing the diameter of an ink droplet generated from a Xerox ink jet deflection testing laboratory printhead. This factor translates into the coverage achieved by the respective ink compositions, that is, the coverage of the dots present on the 4024 paper. Generally, an acceptable K factor is of a value of from about 1 to about 3.

Furthermore, the ink of the present invention can be selected for the development of images with a deflection ink jet printing text fixture, and wherein there are obtained images of acceptable resolution.

Other modifications of the present invention may occur to those skilled in the art based upon a reading of the present disclosure, and these modifications are intended to be included within the scope of the present invention.

What is claimed is:

1. An ink jet composition comprised of a major amount of water, a hydroxyethylated polyethylenimine polymer, and a dye component wherein the polymer has incorporated therein from about 65 percent by weight to about 80 percent by weight of hydroxyethyl groups.

2. A composition in accordance with claim 1 wherein the polyethylenimine is comprised of about 80 percent by weight of hydroxyl groups.

3. A composition in accordance with claim 1 wherein the pH of the ink is from about 8 to about 10.

4. A composition in accordance with claim 1 wherein the dye is black and is selected from the group consisting of Direct Dyes, Acid Dyes, Food Dyes, and Reactive Dyes.

5. A composition in accordance with claim 4 wherein the black dye is Pontamine Black SP Liquid.

6. A composition in accordance with claim 1 wherein a color dye is selected.

7. A composition in accordance with claim 6 wherein the color dye is selected from the group consisting of blue, red, and yellow.

8. A composition in accordance with claim 1 wherein the hydroxyethylated polyethylenimine is present in an amount of from about 2 percent by weight to about 6 percent by weight.

9. A composition in accordance with claim 1 wherein the dye is present in an amount of from about 1 percent by weight to about 10 percent by weight.

10. A composition in accordance with claim 1 further including therein a compound selected from the group consisting of benzyl alcohol, N-n-butyldiethanolamine, 2-(2-butoxyethoxy)-ethanol, and 1-methyl-2-pyrrolidinone.

11. A composition in accordance with claim 10 wherein the compounds selected are present in an amount of from about 0.5 to about 5 percent by weight.

12. A method for the formulation of images which comprises providing an ink jet printing apparatus; generating an image on a substrate; and subsequently affecting development of this image with an ink composition comprised of a major amount of water, a hydroxyethylated polyethylenimine polymer, and a dye component wherein the polymer has incorporated therein from about 65 percent by weight to about about 80 percent by weight of hydroxyethyl groups.

13. A method of imaging in accordance with claim 12 wherein the polyethylenimine is comprised of about 80 percent by weight of hydroxyl groups.

14. A method of imaging in accordance with claim 12 wherein the pH of the ink is from about 8 to about 10.

15. A method of imaging in accordance with claim 12 wherein the dye is black and is selected from the group consisting of Direct Dyes, Acid Dyes, Food Dyes, and Reactive Dyes.

16. A method of imaging in accordance with claim 15 wherein the black dye is Pontamine Black SP Liquid.

17. A method of imaging in accordance with claim 12 wherein a color dye is selected.

18. A method of imaging in accordance with claim 17 wherein the color dye is selected from the group consisting of red, blue and yellow.

19. A method of imaging in accordance with claim 12 wherein the ink further includes therein a compound selected from the group consisting of benzyl alcohol, N-n-butyldiethanolamine, 2-(2-butoxyethoxy)-ethanol, and 1-methyl-2-pyrrolidinone.

20. A composition in accordance with claim 1 wherein the water is present in an amount of from about 70 percent by weight to about 90 percent by weight.

21. An ink jet composition consisting essentially of a major amount of water, a hydroxyethylated polyethylenimine polymer, and a dye component wherein the polymer has incorporated therein from about 65 percent by weight to about 80 percent by weight of hydroxyethyl groups.

22. A composition in accordance with claim 21 wherein the water is present in an amount of from about 70 percent by weight to about 90 percent by weight, the dye component is present in an amount of from about 1 percent by weight to about 10 percent by weight, and the hydroxyethylated polyethylenimine polymer is present in an amount of from about 2 percent by weight to about 5 percent by weight.

23. A composition in accordance with claim 1 wherein the dye is selected from the group consisting of cyan, magenta, yellow and mixtures thereof.

24. A composition in accordance with claim 21 wherein the dye is selected from the group consisting of cyan, magenta, yellow and mixtures thereof.

25. A composition in accordance with claim 1 with a surface tension of from about 30 dynes/cm$^2$ to about 60 dynes/cm$^2$, a viscosity of from about 1.5 to about 3.0, and a waterfastness of from about 80 to about 95 percent.

26. A composition in accordance with claim 21 with a surface tension of from about 30 dynes/cm$^2$ to about 60 dynes/cm$^2$, viscosity of from about 1.5 to about 3.0, and a waterfastness of from about 80 to about 95 percent.

* * * * *